United States Patent Office 3,097,114
Patented July 9, 1963

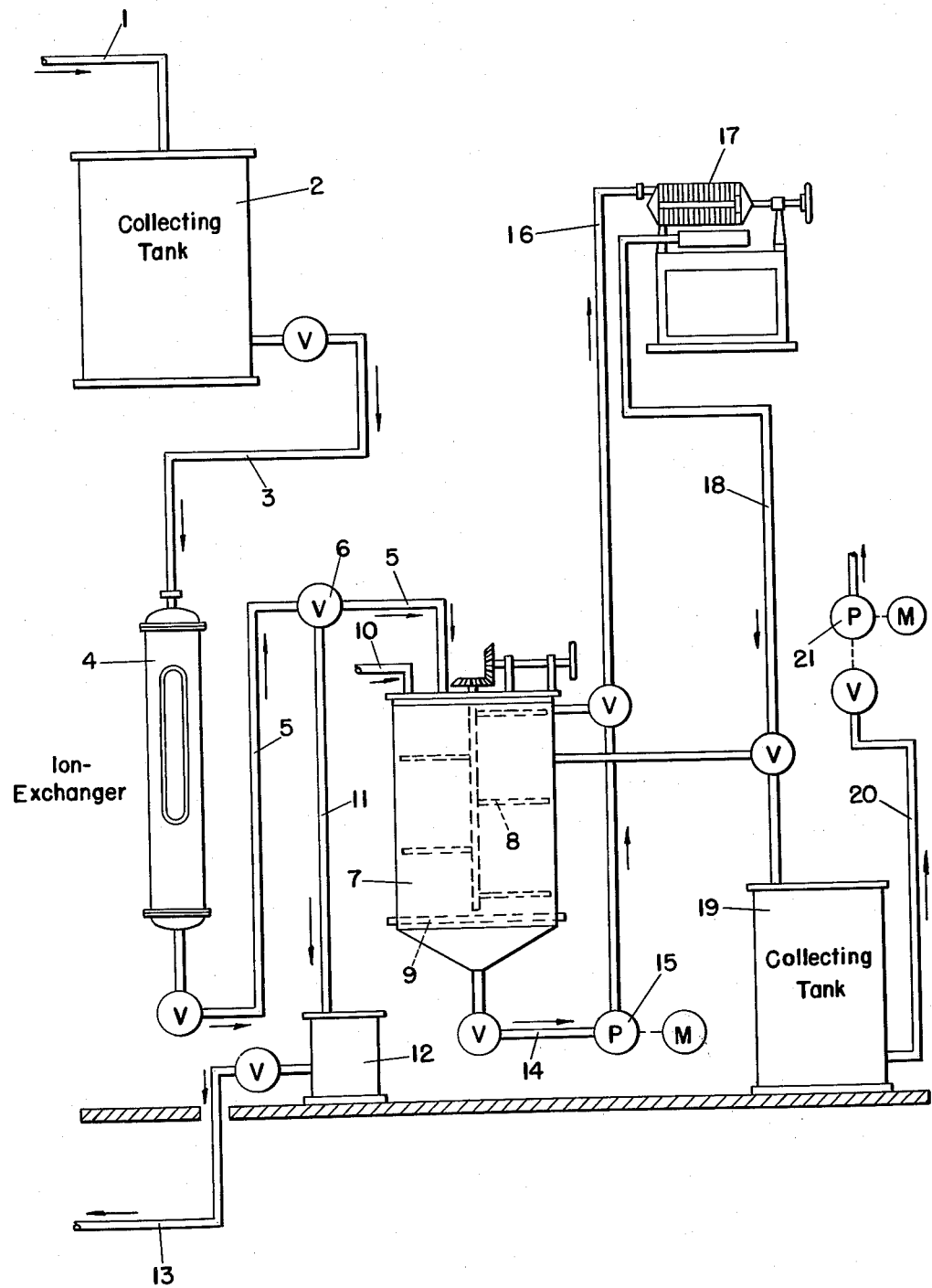

3,097,114
PROCESS FOR PURIFYING SUGAR
Giuseppe Assalini, Genoa, Italy, assignor to Rohm & Haas Company, Philadelphia, Pa., a corporation of Delaware
Filed Aug. 9, 1960, Ser. No. 48,548
7 Claims. (Cl. 127—46)

This invention relates to processes and apparatus for the purification of raw sugar juices by the use of ion exchange resins.

Various methods have been known for the purification of raw sugar juices by ion exchange techniques. Several have been described in my U.S. Patents 2,929,745 and 2,929,746. There, processes are set forth which operate at about 40° C., but it is pointed out that several advantages are obtained through performance of the various operations at room temperatures.

One of the advantages of thus lowering the temperature in those earlier processes is the fact that the anion-exchange resins which are utilized thereby, either alone or in a cationic-anionic resin system, could not long withstand the elevated temperatures before losing their capacity to function acceptably. Another advantage resides in the fact that the chances of the resins developing acidity, which might cause inversion of the sugar, are greatly diminished when the sugar solution to be treated is cooled to room temperatures.

As useful as these and other allied prior art methods are, one drawback to their acceptance by certain of the world's major sugar refiners has been the need to install and operate special cooling equipment, particularly in existing plant arrangements. Since, in most sugar processing plants, the raw juices are obtained from cane and beets by treatments which culminate in the formation of relatively hot sugar-containing solutions, the requirement for cooling in order to attain the aforesaid advantages has been an economic barrier to the widespread acceptance of any ion exchange treatment incorporating same.

My present invention, therefore, will find universal approbation among sugar refiners because it (a) does not require any cooling of the juices that are introduced to the resin beds, (b) avoids passage through any acid conditions and thus avoids the risk of inversion, and (c) makes possible the attainment of a high purity in the treated juices at a lower equipment and operating cost than other ion exchange processes for purifying sugar.

The method according to my present invention is characterized by the fact that a cationic resin, which has been regenerated with a salt, adsorbs the organic nitrogen which is present in the solution to be purified and thus acts as a depurant. The cations supplied by the salt are exchanged for the cations present in the juice, and linked with organic or mineral anions to form organic complexes or mineral salts which can readily be eliminated by forming a flocculent precipitate and filtering. To aid in forming this flocculent precipitate the liquid is treated with a compound which is capable of increasing the amount of flocculation and, simultaneously, acts as a defecant or depurant and also is able to adjust the pH to the desired values.

The salts which are used for regenerating the cationic resin preferably are those which will furnish group II cations, calcium, and magnesium being the ones that are particularly attractive in this process. The organic complexes or mineral salts precipitated by treatment of the effluent (which is obtained when the sugar juices are passed over the resin) are precipitated with the aid of a soluble hydroxide, phosphate, carbonate or bicarbonate of ammonia or the alkali metals.

In the annexed drawing there is illustratively and schematically shown a plant and the cycle of the various operations relative to the method of this invention. The raw sugar juices, even at the elevated temperatures of preceding sugar processing operations, enter through feed pipe 1 into collecting tank 2, then through pipe 3 into the ion-exchanger 4 where there is effected the removal of most of the organic nitrogen in the solution to be purified and there is exchanged for the cations present in the juices the calcium or magnesium ions on the resin in the column.

The thus treated juices leaving the ion-exchanger pass through pipe 5 and three-way valve 6 into mixer 7 which contains stirrers 8 and which is heated by a steam transmitting coil or other such device 9. Also fed into the mixer, through pipe 10, is the phosphate, carbonate or bicarbonate precipitating aid. Leading from valve 6 is pipe 11 through which is eliminated the excess water from the ion exchanger 4. The water is conveniently collected in tank 12 and ejected therefrom as desired through pipe 13.

The contents of mixer tank 7 are emptied through pipe 14 with the aid of pump 15 and sent through pipe 16 into filter 17 where the sugar juices are separated from the precipitate which forms in the tank during treatment. The filtered, purified juices are then passed through pipe 18 into collecting tank 19. Subsequently, the juices are drawn off tank 19, through pipe 20 with the aid of a pump 21, and routed to evaporation and/or other subsequent operations (not illustrated in the drawing).

One of the important advantages of the present invention will readily be appreciated from the foregoing general description of the method. It will be noted that there is no provision for the cooling of the sugar juices, and there needn't be any, since all of the commercialy available cationic resins are extremely resistant to high temperatures. Another reason for not needing to cool the solution is that the risk of inverting the sugar is avoided by virtue of the fact that the cationic resin, since it is not regenerated with acid, does not produce any acidity in the liquid treated therewith.

Other advantages which will be obvious to those skilled in the art reside in the fact that the cationic resins have much higher exchange capacities and longer useful lifetimes than anionic resins which have been used in some earlier processes, plus the fact that the cationic resins are much cheaper than anionic resins.

The novel process provides exceptionally high purity of the end product, on the order of 96–97%, and consequently the proportion of extractable sugar in relation to quantity of raw juices treated reflects a corresponding increase in comparison with the results of prior art techniques. The operating expenses, in comparison with older ion-exchange, sugar processing methods, are considerably reduced because the costs for regenerating the resin and for the flocculating adjuvants are much lower.

The following examples are further illustrative of the invention:

*Example 1*

An ion-exchange column was employed which was about 40 mm. in diameter. It contained approximately 700 cc. of a well-known, strongly acidic cation-exchange resin, a cross-linked styrene-divinylbenzene copolymer having sulfonated functional groups. The height of the resin bed was about 56 cm. The resin was regenerated with 13 lbs./cu. ft. of a 10% aqueous solution of $CaCl_2$ at a flow rate of 1 gal./cu. ft./min., followed by a water rinse of 8 vols./resin vol. initially at the same flow rate but later stepped up to 2 gal./cu. ft./min.

A total of 4980 cc. of diffusion juice, corresponding to 7 vol./resin vol., was passed through the resin column at a flow rate of 180 cc./min. The analysis of the diffusion juice was:

Bx _____ 13.10
Sucrose _____ 11.05
Purity _____ percent__ 84.35
Temp _____ °C__ 35

The first 500 cc. of effluent contained no sucrose and was eliminated. The subsequent effluent was collected in three fractions of 1660 cc. each.

*Fraction A.*—This fraction was not initially analyzed. It was treated with 0.3% by weight of the juice of a concentrated (100%) NaOH solution. The NaOH solution was at 38.8 Bé. and cool. The solution was heated to 80° C. and filtered. The analysis of the rather limpid and light yellow juice was:

Bx _____ 11.60
Sucrose _____ 11.25
Purity _____ 96.98

*Fraction B.*—This fraction was analyzed before further treatment, its content being as follows:

Bx _____ 11.46
Sucrose _____ 10.91
Purity _____ 95.20

This solution was heated to 80° C. and then treated with 0.4% (by weight of the juice) of a concentrated (100%) NaOH solution. The NaOH solution was at 38.8 Bé. and cool. The thus treated juice was filtered; the darker but likewise limpid juice had the following analysis:

Bx _____ 12.11
Sucrose _____ 11.70
Purity _____ 96.61

*Fraction C.*—This fraction was not initially analyzed. The juice was heated to 80° C. and then treated with lime milk in a quantity corresponding to 0.2% juice of CaO. The light colored, limpid filtrate had the following analysis:

Bx _____ 11.84
Sucrose _____ 11.35
Purity _____ 95.86

*Example 2*

An ion-exchange column, prepared and regenerated as described in Example 1, was employed. A total of 12,600 cc. of diffusion juice, corresponding to 18 vol./resin vol., was passed through the resin column at a flow rate of 180 cc./min. The analysis of the diffusion juice was:

Bx _____ 12.19
Sucrose _____ 10.40
Purity _____ 85.31
Temp _____ °C__ 35

After the first 500 cc. had been eliminated, the effluent was collected in three fractions of 4900 cc. each, two of which were treated as follows:

*Fraction A.*—This fraction was not initially analyzed. It was heated up to 80° C. and then treated with lime milk in a quantity corresponding to 0.18% juice of CaO. The light yellow filtrate was found on analysis to contain:

Bx _____ 10.80
Sucrose _____ 10.30
Purity _____ 95.37

*Fraction B.*—This fraction was analyzed before treatment and found to contain:

Bx _____ 11.0
Sucrose _____ 10.30
Purity _____ 93.64

The solution was heated to 80° C. and then treated with lime milk in a quantity corresponding to 0.26% juice of CaO. The light yellow filtrate analyzed as follows:

Bx _____ 11.34
Sucrose _____ 10.50
Purity _____ 92.59

*Example 3*

An ion-exchange column was employed which was about 4 mm. in diameter. It contained approximately 700 cc. of a well-known, strong acidic cation-exchange resin, a cross-linked styrene-divinylbenzene copolymer having sulfonated functional groups. The height of the resin bed was about 56 cm. The resin was regenerated with 13 lbs./cu. ft. of a 10% aqueous solution of $CaCl_2$ which solution had been acidified with HCl to a pH of 3 in order to aid in the recovery of any amino-acids adsorbed by the resins. The regeneration was carried out at a flow rate of 1 gal./cu. ft./min., followed by a water rinse of 8 vols./resin vol. at the same flow rate except near the end when it was doubled.

A total of 14 liters of diffusion juice, corresponding to 20 vol./resin vol., was passed through the resin column at a flow rate of 160 cc./min. The analysis of the diffusion juice was:

Bx _____ 11.80
Sucrose _____ 9.80
Purity _____ 83.05
Temp _____ °C__ 35

The first 500 cc. of effluent contained no sucrose and was eliminated. The subsequent effluent was collected and found to have the following analysis:

Bx _____ 10.02
Sucrose _____ 9.40
Purity _____ 93.81

The effluent was heated to 80° C., and then treated with lime milk in a quantity corresponding to 0.50% juice of CaO. After this treatment a first carbonation (with $CO_2$) was carried out until the solution had a pH of 9, at which time it was filtered. The filtrate was subjected to a second carbonation until the pH was 7.8 when it was filtered. The filtrate had the following analysis:

Bx _____ 10.09
Sucrose _____ 9.40
Purity _____ 93.16

*Example 4*

An ion-exchange column, prepared and regenerated exactly as described in Example 1, was employed. A total of 28 liters of diffusion juice, corresponding to 40 vol./resin vol., was passed through the resin column at a flow rate of 100 cc./min. The analysis of the diffusion juice was:

Bx _____ 11.80
Sucrose _____ 9.85
Purity _____ 83.47
Temp _____ °C__ 35

After the first 500 cc. had been eliminated, the effluent was collected in four 7000 cc. fractions which analyzed as follows:

|  | A | B | C | D |
|---|---|---|---|---|
| Bx | 10.40 | 10.40 | 10.65 | 11.05 |
| Sucrose | 9.70 | 9.80 | 9.55 | 9.70 |
| Purity | 93.27 | 94.23 | 89.67 | 87.78 |

*Example 5*

An ion-exchange column, prepared and regenerated exactly as described in Example 1, was employed. A total of 25 liters of diffusion juice, corresponding to 35 vol./resin vol., was passed through the resin column at a flow rate of 150 cc./min. The analysis of the diffusion juice was:

Bx ------------------------------------------------ 11.45
Sucrose -------------------------------------------- 9.40
Purity -------------------------------------------- 82.09
Temp -------------------------------------- °C-- 35

After the first 500 cc. had been discarded, the effluent was collected in four 6000 cc. fractions which analyzed as follows:

|  | A | B | C | D |
|---|---|---|---|---|
| Bx | 10.17 | 10.37 | 10.55 | 10.48 |
| Sucrose | 9.35 | 9.45 | 9.35 | 9.25 |
| Purity | 91.94 | 91.13 | 88.63 | 88.26 |

*Example 6*

An ion-exchange column, prepared and regenerated exactly as described in Example 1, was employed. A total of 25 liters of diffusion juice, corresponding to 35 vol./resin vol., was passed through the resin column at a flow rate of 100 cc./min. The analysis of the diffusion juice was:

Bx ------------------------------------------------ 12.50
Sucrose ------------------------------------------ 10.50
Purity -------------------------------------------- 84.00
Temp -------------------------------------- °C-- 35

After elimination of the first 500 cc. the effluent was collected in four 6000 cc. fractions, the first three of which analyzed as follows:

|  | A | B | C |
|---|---|---|---|
| Bx | 10.92 | 11.20 | 11.30 |
| Sucrose | 10.10 | 10.20 | 9.90 |
| Purity | 92.49 | 91.07 | 87.61 |

Fraction B was heated to 80° C. and then treated with 0.40% juice of concentrated (100%) NaOH. The NaOH solution was at 38.8 Bé. The treated solution was then filtered, the dark, limpid filtrate analyzing as follows:

Bx ------------------------------------------------ 11.10
Sucrose ------------------------------------------ 10.70
Purity -------------------------------------------- 96.40

Fraction C was heated to 80° C. and then treated with lime milk in a quantity corresponding to 0.70% juice of CaO. The solution was filtered, and the light yellow filtrate analyzed as follows:

Bx ------------------------------------------------ 12.30
Sucrose ------------------------------------------ 10.85
Purity -------------------------------------------- 87.50

*Example 7*

An ion-exchange column, prepared and regenerated as described in Example 1, was employed. A total of 20 liters of diffusion juice, corresponding to 30 vol./resin vol., was passed through the resin column at a flow rate of 250 cc./min. The analysis of the diffusion juice was:

Bx ------------------------------------------------ 12.35
Sucrose ------------------------------------------ 10.60
Purity -------------------------------------------- 85.83
Temp -------------------------------------- °C-- 35

After eliminating the first 500 cc., the effluent was collected together. The average analysis of the resulting juice was:

Bx ------------------------------------------------ 11.36
Sucrose ------------------------------------------ 10.60
Purity -------------------------------------------- 93.31

*Example 8*

An ion-exchange column, prepared and regenerated as described in Example 1, was employed. A total of 20 liters of diffusion juice, corresponding to 30 vol./resin vol., was passed through the resin column at a flow rate of 100 cc./min. The analysis of the diffusion juice was:

Bx ------------------------------------------------ 12.55
Sucrose ------------------------------------------ 10.35
Purity -------------------------------------------- 82.47
Temp -------------------------------------- °C-- 35

After eliminating the first 500 cc., the effluent was collected together. The average analysis of the resulting juice was:

Bx ------------------------------------------------ 11.46
Sucrose ------------------------------------------ 10.40
Purity -------------------------------------------- 90.75

*Example 9*

An ion-exchange column, prepared and regenerated as described in Example 1, was employed. A total of 25 liters of diffusion juice, corresponding to 35 vol./resin vol., was passed through the resin column at a flow rate of 80 cc./min. The analysis of the diffusion juice was:

Bx ------------------------------------------------ 11.95
Sucrose ------------------------------------------ 10.20
Purity -------------------------------------------- 85.35
Temp -------------------------------------- °C-- 35

After eliminating the first 500 cc., the effluent was collected together. The average analysis of the resulting juice was:

Bx ------------------------------------------------ 11.26
Sucrose ------------------------------------------ 10.40
Purity -------------------------------------------- 92.36

*Example 10*

An ion-exchange column, prepared and regenerated as described in Example 1, was employed. A total of 20 liters of diffusion juice, corresponding to 30 vol./resin vol., was passed through at a flow rate of 80 cc./min. The analysis of the diffusion juice was:

Bx ------------------------------------------------ 12.15
Sucrose ------------------------------------------ 10.30
Purity -------------------------------------------- 84.76
Temp -------------------------------------- °C-- 35

After eliminating the first 500 cc., the effluent was collected in four fractions which analyzed as follows:

|  | A | B | C | D |
|---|---|---|---|---|
| Bx | 10.96 | 11.30 | 11.50 | 10.76 |
| Sucrose | 10.20 | 10.10 | 9.80 | 9.60 |
| Purity | 93.06 | 89.38 | 85.22 | 89.22 |

Fractions A and B comprised 5000 cc., fraction C was 4000 cc., and fraction D was 6000 cc. Each of the fractions was heated to 80° C. and then treated with lime milk in a quantity corresponding to 0.80% juice of CaO, carbonated with $CO_2$ up to pH 8, and filtered. The limpid and light colored filtrates analyzed as follows:

|  | A | B | C | D |
|---|---|---|---|---|
| Bx | 10.55 | 10.62 | 10.86 | 10.16 |
| Sucrose | 10.10 | 9.70 | 9.60 | 9.40 |
| Purity | 95.73 | 91.34 | 88.39 | 92.52 |

*Example 11*

An ion-exchange column, prepared and regenerated as described in Example 1, was employed. A total of 20 liters of diffusion juice, corresponding to 30 vol./resin vol., was passed through at a flow rate of 80 cc./min. The analysis of the diffusion juice was:

Bx ............................................. 12.25
Sucrose ......................................... 10.30
Purity .......................................... 84.08
Temp ......................................... °C.. 35

After eliminating the first 500 cc., the effluent was collected in four fractions of 5000 cc. each; they analyzed as follows:

|  | A | B | C | D |
|---|---|---|---|---|
| Bx | 10.21 | 10.77 | 11 | 11.11 |
| Sucrose | 9.50 | 9.80 | 9.90 | 9.90 |
| Purity | 93.04 | 90.99 | 90.00 | 89.10 |

*Example 12*

An ion-exchange column, prepared and regenerated as described in Example 1, was employed. A total of 20 liters of diffusion juice, corresponding to about 30 vol./resin vol., was passed through at a flow rate of 80 cc./min. The analysis of the diffusion juice was as follows:

Bx ............................................. 12.60
Sucrose ......................................... 10.70
Purity .......................................... 84.97
Temp. ........................................ °C.. 35

After eliminating the first 500 cc., the effluent was collected and analyzed as follows:

Bx ............................................. 11.40
Sucrose ......................................... 10.30
Purity .......................................... 90.35

The effluent was then heated to 80° C. and treated with lime milk in a quantity corresponding to 0.80% juice of CaO. The limpid and light colored filtrate analyzed as follows:

Bx ............................................. 11.20
Sucrose ......................................... 10.70
Purity .......................................... 95.53

*Example 13*

An ion-exchange column, prepared and regenerated as described in Example 1, was employed. A total of 40 liters of diffusion juice, corresponding to about 60 vol/resin vol., was passed through at a flow rate of 80 cc./min. The analysis of the diffusion juice was as follows:

Bx ............................................. 12.15
Sucrose ......................................... 10.10
Purity .......................................... 83.12
Temp ......................................... °C.. 35

After eliminating the first 500 cc., the effluent was collected and analyzed as follows:

Bx ............................................. 11.07
Sucrose ......................................... 10.10
Purity .......................................... 91.24

The effluent was then heated to 80° C. and treated with lime milk corresponding to 0.70% juice of CaO. The limpid, light colored filtrate analyzed as follows:

Bx ............................................. 10.67
Sucrose ......................................... 9.90
Purity .......................................... 92.78

*Example 14*

An ion-exchange column, prepared and regenerated as described in Example 1, was employed. A total of 20 liters diffusion juice, corresponding to about 30 vol/resin vol., was passed through at a flow rate of 120 cc./min. The analysis of the diffusion juice was as follows:

Bx ............................................. 11.80
Sucrose ......................................... 10.00
Purity .......................................... 84.70
Temp ......................................... °C.. 35

After eliminating the first 500 cc. the effluent was collected and analyzed as follows:

Bx ............................................. 10.77
Sucrose ......................................... 10.05
Purity .......................................... 93.31

*Example 15*

An iron column, having a diameter of 100 mm., was used in this experiment. It contained about 15 liters of the same resin described in Example 1 above. The height of the resin was about 150 cm. Regeneration of the resin was carried out with a 10% solution of $CaCl_2$, the regeneration level being 13 lbs./cu. ft. A total of 450 liters of diffusion juice, corresponding to about 30 vol./resin vol., was passed through at a flow rate of 2000 cc./min. The analysis of the diffusion juice was as follows:

Bx ............................................. 12.45
Sucrose ......................................... 10.35
Purity .......................................... 83.13
Temp ......................................... °C.. 35

After the first 10 liters, which contained no sugar, were eliminated, the effluent was collected in nine fractions of 50 liters each. The analytical data for each fraction were as follows:

| Fraction | Bx | Sucrose | Purity |
|---|---|---|---|
| A | 10.93 | 9.90 | 90.57 |
| B | 10.87 | 9.80 | 90.15 |
| C | 11.40 | 10.50 | 92.10 |
| D | 11.20 | 10.30 | 91.96 |
| E | 10.92 | 10.00 | 91.57 |
| F | 11.45 | 10.40 | 90.82 |
| G | 11.48 | 10.40 | 90.59 |
| H | 11.08 | 10.10 | 91.15 |
| I | 11.30 | 10.20 | 90.26 |

The fractions were then collected together, heated to 80° C., treated with lime milk corresponding to 0.80% juice of CaO, and filtered. The light colored and limpid filtrate analyzed as follows:

Bx ............................................. 11.10
Sucrose ......................................... 10.60
Purity .......................................... 95.49

This juice was conveyed to evaporation and crystallization with the production of first and second products and final molasses.

The embodiments of the invention in which an exclusive property of privilege is claimed are defined as follows:

1. Process for the purification of sugar juices by means of synthetic ion exchange resins without first cooling them after extracting the raw juices from their natural sources, comprising, treating the undefecated sugar juices with a cation-exchange resin which has on its exchange sites group II metallic cations which will react with soluble alkali metal and ammonia hydroxides, phosphates and carbonates to form a flocculent precipitate, heating the thus treated juices to a temperature even higher than what they had before being contacted with the ion-exchange resin, then reacting the heated juices with a compound from the class consisting of soluble hydroxides, phosphates, carbonates and bicarbonates of ammonia and the alkali metals, whereby a flocculent precipitate of organic complexes and mineral salts forms, and finally removing the precipitate from the thus purified sugar juices.

2. Process of claim 1 in which sodium hydroxide is the compound used to react with the heated juices to form the flocculent precipitate which is removed to leave purified sugar juices.

3. Process of claim 1 in which calcium hydroxide is the compound used to react with the heated juices to form the flocculent precipitate which is removed to leave purified sugar juices.

4. Process of claim 1 followed by the steps of evaporating and crystallizing the sugar from the purified sugar juices.

5. Process of claim 1 in which the cations on the exchange sites of the resin are from the class consisting of calcium and magnesium.

6. Process of claim 5 in which the cation exchange resin is in the calcium form.

7. Process of claim 5 in which the cation exchange resin is in the magnesium form.

References Cited in the file of this patent

UNITED STATES PATENTS

| | | |
|---|---|---|
| 2,568,925 | Mills | Sept. 25, 1951 |
| 2,635,061 | McBurney | Apr. 14, 1953 |
| 2,678,288 | Cotton et al. | May 11, 1954 |
| 2,929,746 | Assalini | Mar. 22, 1960 |
| 2,988,463 | Vajna | June 13, 1961 |